United States Patent
Ziebarth et al.

(10) Patent No.: US 7,928,032 B2
(45) Date of Patent: Apr. 19, 2011

(54) CATALYZED SOOT FILTER AND METHOD(S) TO MAKE THESE

(75) Inventors: Robin Ziebarth, Midland, MI (US); Robert T. Nilsson, Midland, MI (US); Steven J. Martin, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 328 days.

(21) Appl. No.: 12/338,232

(22) Filed: Dec. 18, 2008

(65) Prior Publication Data

US 2009/0163356 A1 Jun. 25, 2009

Related U.S. Application Data

(60) Provisional application No. 61/015,941, filed on Dec. 21, 2007.

(51) Int. Cl.
| | |
|---|---|
| B01J 27/224 | (2006.01) |
| B01J 8/02 | (2006.01) |
| B01D 39/00 | (2006.01) |
| B01D 50/00 | (2006.01) |
| B01D 59/50 | (2006.01) |
| B01D 39/06 | (2006.01) |
| B01D 39/20 | (2006.01) |
| B01D 46/00 | (2006.01) |
| B01D 53/56 | (2006.01) |
| B01D 53/94 | (2006.01) |
| F01N 3/00 | (2006.01) |
| F01N 3/10 | (2006.01) |
| F01N 3/02 | (2006.01) |
| C01B 21/00 | (2006.01) |
| C01B 23/00 | (2006.01) |
| C01B 25/00 | (2006.01) |
| C01B 31/00 | (2006.01) |
| C01B 33/00 | (2006.01) |
| C01B 35/00 | (2006.01) |
| C01G 28/00 | (2006.01) |
| C01G 30/00 | (2006.01) |

(52) U.S. Cl. ...... 502/178; 55/282.2; 55/282.3; 55/385.3; 55/523; 55/524; 55/DIG. 5; 55/DIG. 10; 55/DIG. 30; 95/273; 95/278; 60/297; 60/299; 60/301; 60/311; 423/213.2; 423/213.5

(58) Field of Classification Search .......... 502/178, 502/439; 55/282.2, 282.3, 385.3, 523, 524, 55/DIG. 5, DIG. 10, DIG. 30; 95/273, 278; 60/297, 299, 301, 311; 423/213.2, 213.5; 264/628, 630, 631; 422/177, 180

See application file for complete search history.

(56) References Cited

U.S. PATENT DOCUMENTS 4,226,896 A 10/1980 Coburn et al.
(Continued)

FOREIGN PATENT DOCUMENTS

CA 2224250 1/1997
(Continued)

OTHER PUBLICATIONS

Defense Technical Information Center Publication, Preceramic Polymers: Past, Present and Future, Seyferth, Dietmar, Accession No. ADA258327, Nov. 2, 1992, R&T Project Code 4132053, Technical Report No. 37.

(Continued)

*Primary Examiner* — Patricia L Hailey

(57) ABSTRACT

An improved soot catalyst is comprised of an alkali compound at least partially coated by a ceramic coating comprised of C bonded to a metal, semimetallic element or combination thereof. The improved soot catalyst may be employed in catalyzed Diesel particulate filters. In one method to make a catalyzed Diesel particulate filter, the improved filter is made by contacting a porous ceramic body having an alkali catalyst thereon, coating the alkali catalyst with an organic ceramic precursor, heating the ceramic body to a temperature in an atmosphere sufficient to decompose the organic ceramic precursor to form the soot catalyst on the porous ceramic body without volatilizing substantial amount of the alkali catalyst away.

20 Claims, 2 Drawing Sheets

U.S. PATENT DOCUMENTS

| | | | |
|---|---|---|---|
| 4,310,482 A | 1/1982 | Baney | |
| 4,515,758 A | 5/1985 | Domesle et al. | |
| 4,740,360 A | 4/1988 | Geus et al. | |
| 4,800,221 A | 1/1989 | Marko | |
| 4,832,895 A | 5/1989 | Johnson | |
| 5,013,705 A | 5/1991 | Koberstein et al. | |
| 5,063,192 A | 11/1991 | Murakami et al. | |
| 5,098,455 A | 3/1992 | Doty et al. | |
| 5,130,109 A | 7/1992 | Wan | |
| 5,173,349 A | 12/1992 | Yavuz et al. | |
| 5,194,154 A | 3/1993 | Moyer et al. | |
| 5,196,120 A * | 3/1993 | White | 210/504 |
| 5,198,007 A | 3/1993 | Moyer et al. | |
| 5,254,519 A | 10/1993 | Wan et al. | |
| 5,312,649 A | 5/1994 | Barton et al. | |
| 5,340,516 A | 8/1994 | Yavuz et al. | |
| 5,611,832 A * | 3/1997 | Suzuki et al. | 55/523 |
| 5,766,562 A | 6/1998 | Chattha et al. | |
| 5,821,190 A | 10/1998 | Kurabayashi et al. | |
| 5,939,354 A | 8/1999 | Golden | |
| 5,993,762 A | 11/1999 | Rajaram et al. | |
| 6,306,335 B1 | 10/2001 | Wallin et al. | |
| 6,395,840 B1 | 5/2002 | Paul et al. | |
| 6,596,665 B2 | 7/2003 | Wallin et al. | |
| 6,669,751 B1 | 12/2003 | Ohno et al. | |
| 6,699,448 B2 | 3/2004 | Wu et al. | |
| 6,736,875 B2 | 5/2004 | Gadkaree et al. | |
| 6,770,583 B2 | 8/2004 | Keller | |
| 6,797,666 B2 | 9/2004 | Harada et al. | |
| 6,849,181 B2 | 2/2005 | Ogunwumi et al. | |
| 7,001,861 B2 | 2/2006 | Beall et al. | |
| 7,037,875 B2 | 5/2006 | Hu et al. | |
| 7,078,004 B2 | 7/2006 | Voss et al. | |
| 7,253,134 B2 * | 8/2007 | Furukawa et al. | 502/178 |
| 7,381,681 B2 | 6/2008 | Nilsson et al. | |
| 7,425,297 B2 | 9/2008 | Saha et al. | |
| 7,427,309 B2 | 9/2008 | Ohno et al. | |
| 7,438,739 B2 | 10/2008 | Ziebarth et al. | |
| 2001/0038810 A1 | 11/2001 | Wallin et al. | |
| 2002/0044897 A1 | 4/2002 | Kakwani et al. | |
| 2002/0131914 A1 | 9/2002 | Sung | |
| 2002/0197191 A1 | 12/2002 | Takeshima et al. | |
| 2003/0124037 A1 | 7/2003 | Voss et al. | |
| 2003/0175192 A1 | 9/2003 | Hu et al. | |
| 2004/0020359 A1 | 2/2004 | Koermer et al. | |
| 2005/0031513 A1 | 2/2005 | McNamara et al. | |
| 2005/0164879 A1 | 7/2005 | Chen | |
| 2005/0272602 A1 * | 12/2005 | Ninomiya | 502/439 |
| 2006/0018806 A1 | 1/2006 | Ziebarth et al. | |
| 2006/0188806 A1 | 8/2006 | Lee et al. | |
| 2008/0057268 A1 | 3/2008 | Lu et al. | |

FOREIGN PATENT DOCUMENTS

| | | |
|---|---|---|
| EP | 0864355 B1 | 3/2001 |
| EP | 1437491 B1 | 8/2006 |
| EP | 1437491 B1 | 8/2006 |
| EP | 1142619 B1 | 1/2007 |
| GB | 1119180 | 7/1968 |
| WO | WO 99/12642 | 3/1999 |
| WO | 2005102959 A1 | 11/2005 |
| WO | 2006015033 A1 | 2/2006 |
| WO | 2008027423 A2 | 3/2008 |
| WO | 2009/085942 * | 9/2009 |

OTHER PUBLICATIONS

Comprehensive Chemistry of Polycarbosilanes, Polysilazanes, and Polycarbosilazanes as Precursors of Ceramics, Birot, M. et al., Chem. Rev. 1995, 95, 1443-1477.

Thermal Decomposition of Commercial Silicone Oil to Produce High Yield High Surface Area SiC Nanorods, POL, V.G., et al., J. Phys. Chem. B2006, 110, 11237-11240.

* cited by examiner

CATALYZED SOOT FILTER AND METHOD(S) TO MAKE THESE

CROSS-REFERENCE TO RELATED APPLICATION

This application claims the benefit of U.S. Provisional Application Ser. No. 61/015,941 filed Dec. 21, 2007 which is hereby incorporated by reference.

FIELD OF THE INVENTION

The present invention relates to an improved catalyzed particulate filter.

BACKGROUND OF THE INVENTION

Diesel engines, because of the way they operate, emit soot particles or very fine droplets of condensate or a conglomerate of the two (particulates) as well as typical harmful gasoline engine exhausts (i.e., HC and CO). These "particulates" (herein Diesel soot), are rich in condensed, polynuclear hydrocarbons, some of which may be carcinogenic.

As the awareness of the danger Diesel soot presents to health collides with the need for greater fuel efficiency that Diesel engines provide, regulations have been enacted curbing the amount of Diesel soot permitted to be emitted. To meet these challenges, soot filters have been used. When using such a filter, the filter must be periodically regenerated by burning off the soot. However, because the temperature where Diesel soot ignites is significantly higher than the normal operating temperature of a Diesel engine, a number of catalysts have been proposed to reduce the ignition temperature of the Diesel soot.

Generally, catalysts containing alkali or alkaline oxides have been used to substantially reduce the Diesel soot ignition temperature significantly as described, for example, in JP 2001-17449; WO 03/011437; US 2002/0132727; US 2006/018806 and US 2002/0197191. Unfortunately, these catalyst are generally volatile and/or destructive to the filters resulting in impractical short life times. In addition, these catalysts still have required substantial amounts of noble metal catalysts to reduce the HC and CO gases that are emitted along with the Diesel soot.

Other oxides such as rare earth oxides (e.g., U.S. Pat. No. 4,515,758; US 2002/0197191; US 2002/0044897; US 2003/0124037; WO 01/02083) and base metal oxides have also been used in conjunction with noble metal catalysts to attempt to lower the Diesel soot ignition temperature while also catalyzing the HC and CO emissions. Unfortunately, these catalysts have tended to required substantial amounts of expensive noble metal catalysts and/or rare earth oxides.

Therefore, it would be desirable to provide a catalyst for a Diesel particulate filter that avoids one or more problems of the prior art such as one of the aforementioned problems. In particular, it would be desirable to provide a catalyst that eliminates the amount of expensive rare earth oxide and noble metal catalysts that have been required in the prior art to oxidize soot, while still achieving long lifetimes.

SUMMARY OF THE INVENTION

A first aspect of this invention is a catalyzed soot filter comprising a porous ceramic having, on at least a portion of the porous ceramic, a soot catalyst comprised of an alkali compound that is at least partially coated with a ceramic coating comprised of C bonded to a metal, semimetallic element or combination thereof. Surprisingly, the catalyzed soot filter displays excellent soot combustion, long lifetimes without either rapid alkali volatilization or attack of the porous ceramic as is common with alkali oxide catalysts. This is particularly surprising, since the coating ceramic contains carbon, which is catalyzed by the alkali catalyst, all the while the catalytic effect is not diminished appreciably, if at all, compared to an alkali catalyst not similarly coated.

A second aspect of the invention is a method of forming a catalyzed soot filter comprising, contacting a porous ceramic body with an alkali compound, coating the alkali compound with a material that forms a ceramic coating comprised of C bonded to a metal, semimetallic element or combination thereof upon heating, and heating the porous ceramic body to form said catalyzed soot filter comprised of the porous ceramic body coated with soot catalyst comprised of an alkali compound having coated on at least a portion of the alkali compound a ceramic coating comprised of C bonded to a metal, semimetallic element or combination thereof.

In another aspect, the invention is soot catalyst comprised of an alkali compound at least partially coated by a ceramic coating comprised of C bonded to a metal, semimetallic element or combination thereof. The soot catalyst then may be applied to ceramic bodies such as honeycombs to make the first aspect of the invention.

The soot catalyst and catalyzed soot filter may be used in any applications in which soot needs to be removed from a gaseous stream such as an automobile, train, truck or stationary power plant exhaust. The catalyzed soot filter is particularly useful to remove soot from Diesel engine exhausts.

DETAILED DESCRIPTION OF THE INVENTION

Catalyzed Soot Filter

Figure 1:
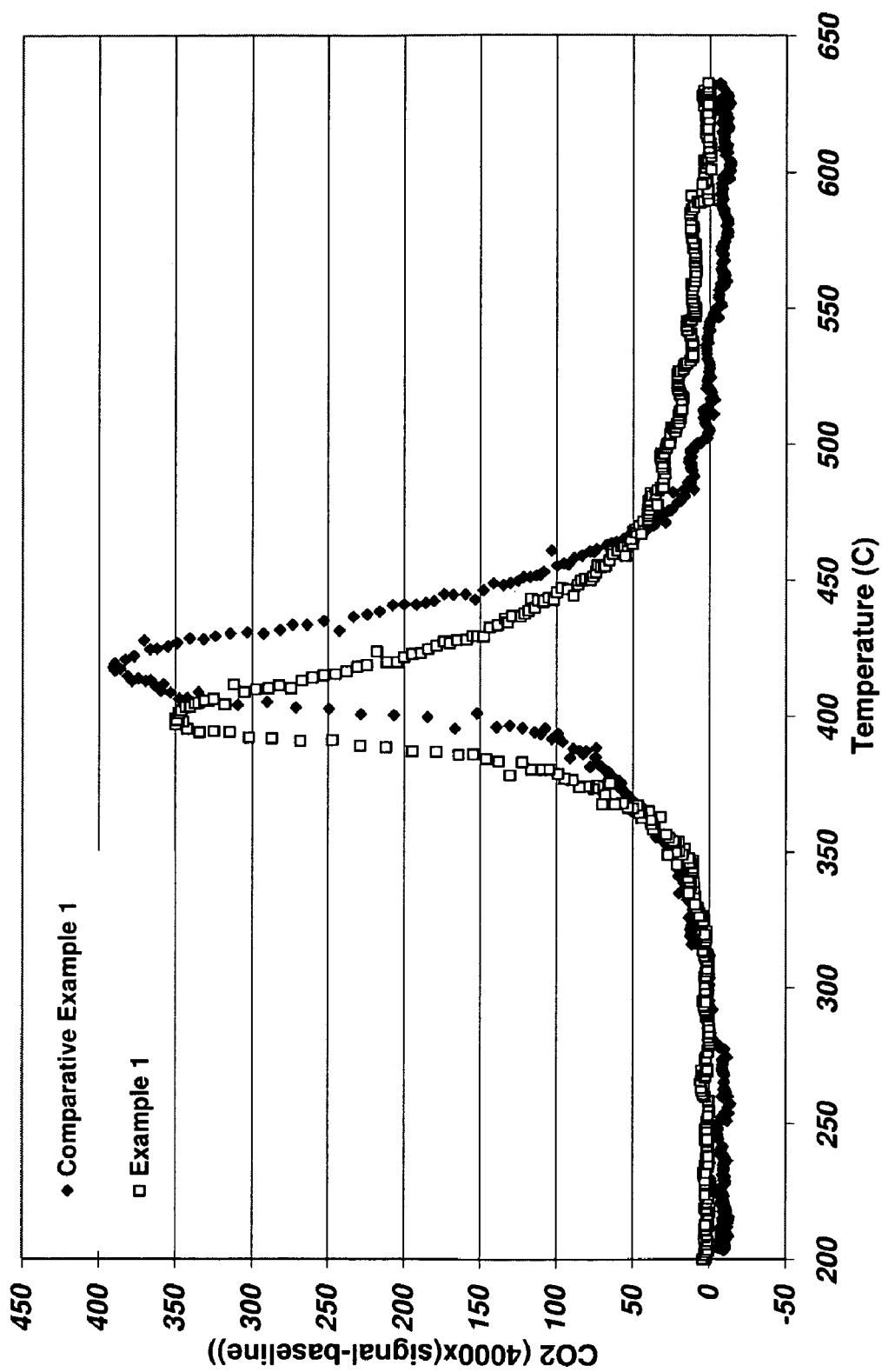
FIG. 1 is a graph of the $CO_2$ concentration in the exhaust during the regeneration of the Diesel particulate filter having the soot catalyst of this invention (Example 1) versus the same filter having the same alkali catalyst that is not coated with a carbon containing ceramic coating (Comparative Example 1) after being loaded with soot one time (initial regeneration).

In one aspect, the invention is a catalyzed soot filter, soot being a carbon based material such as described above for Diesel soot. The catalyzed soot filter is comprised of a porous ceramic.

The porous ceramic body may be any suitable ceramic, for example, such as those known in the art for filtering Diesel soot. Exemplary ceramics include alumina, zirconia, silicon carbide, silicon nitride and aluminum nitride, silicon oxynitride and silicon carbonitride, mullite, cordierite, beta spodumene, aluminum titanate, strontium aluminum silicates, lithium aluminum silicates. Preferred porous ceramic bodies include silicon carbide, cordierite and mullite or combination thereof. The silicon carbide is preferably one described in U.S. Pat. No. 6,669,751B1 and WO publications EP1142619A1, WO 2002/070106A1. Other suitable porous bodies are described by WO 2004/011386A1, WO 2004/011124A1, US 2004/0020359A1 and WO 2003/051488A1.

The mullite is preferably a mullite having an acicular microstructure. Examples of such acicular ceramic porous bodies include those described by U.S. Pat. Nos. 5,194,154; 5,173,349; 5,198,007; 5,098,455; 5,340,516; 6,596,665 and 6,306,335; U.S. Patent Application Publication 2001/0038810; and International PCT publication WO 03/082773.

The porous ceramic body, generally, has a porosity of about 30% to 85%. Preferably, the porous ceramic body has a porosity of at least about 40%, more preferably at least about 45%, even more preferably at least about 50%, and most preferably at least about 55% to preferably at most about 80%, more preferably at most about 75%, and most preferably at most about 70%.

The porous ceramic body has on at least a portion of the porous ceramic the alkali catalyst having thereon a ceramic coating comprised of C (coated alkali catalyst). Portion means any effective amount of the coated alkali catalyst present on the porous ceramic body such that the soot balance point is lowered compared to a bare porous ceramic body of like composition. The soot balance point is where the soot deposition and combustion rates are equal. Generally, at least about 10% of the surface of the porous ceramic is covered by the coated alkali catalyst. Preferably, at least about 20%, more preferably at least about 30%, even more preferably at least about 50%, and most preferably at least about 75% of the surface of the porous ceramic body is covered by the catalytic phase. In a preferred embodiment essentially the entire surface of the porous ceramic is covered by the catalytic phase.

In one embodiment, at least a portion of the coated alkali catalyst is fused to the porous ceramic body. Fused means that the coated alkali catalyst is bound to the porous ceramic bonded via a covalent or polar bond. For example, the alkali catalyst may be present as a grain boundary amorphous phase on the ceramic grains of the porous ceramic body as well as being present in the ceramic grain boundary junctions such as described by US Pat. Appl. No. 2006/018806 with the ceramic coating comprised of Si and C coated upon such alkali catalytic amorphous phase. In this preferred body, generally, all of the alkali catalyst is fused to the ceramic grains of the porous ceramic body.

As just described, the alkali catalytic phase may be amorphous as described in US Pat. Appl. No. 2006/018806, but may also be crystalline such as known alkali catalysts such as an alkali oxide. When the alkali catalyst is amorphous, amorphous means that there is no long range molecular structure that is detectable using typical analytical techniques. That is, there may be some very small ordered structure, but due to the size of such order, the techniques to measure such order, for example, fails to detect or is not substantially different than an amorphous material. For example, the ordered domains may be of such a small size that X-ray diffraction or electron diffraction results in such diffuse scattering that if such domains were present they would be of a size of at most about 50 to 100 nanometers.

When alkali catalyst is amorphous, a small portion of the alkali may precipitate as a carbonate or bicarbonate when the amount of alkali increases relative to the amount of silicate, aluminate or combination thereof of the colloid applied. Illustratively, an X-ray diffraction pattern may display small peaks discernable above the noise of the X-ray technique. For example, at a mole ratio of $Cs_2O$ to $SiO_2$ of 1 to 1 in the colloid applied to an acicular mullite porous ceramic body such carbonate/bicarbonate peaks have been observed and these catalysts are still an embodiment of this invention. At lower ratios, such carbonate/bicarbonate peaks become less and less discernable. For example, at a ratio of about 1 to 4, such peaks are difficult to discern from the background noise if at all.

The alkali catalyst is comprised of an alkali compound such as an oxide, carbonate, nitrate or combination thereof. Preferably, the alkali catalyst is an oxide. In one embodiment the alkali is an oxide glass. Preferably, when the alkali catalyst is a glass it is comprised of Si, Al or combination thereof. The alkali catalyst may contain any alkali or combination of alkali atoms. Preferably, the alkali is Na, K, Rb, Cs or combination thereof. More preferably the alkali is Na, K, Cs or combination thereof. Even more preferably the alkali is K, Cs or combination thereof. Most preferably the alkali is K or Cs.

The amount of alkali in the alkali catalyst may be any amount sufficient to catalyze the combustion of soot. For example, when using an amorphous alkali glass, generally, the amount of alkali within the glass is from about 0.01 to 50% by mole. Preferably the amount of alkali within the glass is at least about 0.5%, more preferably at least about 1% and most preferably at least about 2% to preferably at most about 25%, more preferably at most about 20%, and most preferably at most about 15% by mole. The amount of alkali, generally, corresponds to an amount of alkali present within the catalyzed porous ceramic body of at least about 0.05% to about 10% by weight. Preferably the amount of alkali is at least about 0.1%, more preferably at least about 0.2% and most preferably at least about 0.3% to preferably at most about 7%, more preferably at most about 5% and most preferably at most about 3% by weight.

The alkali catalyst when present in an oxide glass may have Si, Al, or combination thereof. This means that within the glass, there are silicate (e.g., Si—O tetrahedral structures), aluminate (e.g., Al—O octahedral structures) or combinations thereof (aluminosilicate). The amount of Si, Al or combination thereof may vary over a large range, so long as there is enough such that, for example, the volatility of the alkali at typical operating temperatures (about 500° C.) is suppressed. Generally, the amount of Si, Al, or combination can vary over a wide range depending on the glass and alkali present in the glass and other components that may be present in the glass. For example the Si, Al, or combination thereof may range from 99.95 to 50 mole percent. In a preferred embodiment, the oxide glass is a silicate. In a particularly preferred embodiment, the silicate is a potassium or cesium silicate.

The alkali catalyst has thereon a ceramic coating comprised of C (the combination of alkali catalyst coated with the ceramic coating comprised of carbon being the "soot catalyst" of aspect 3 of the invention). Ceramic is understood to mean an inorganic compound that may be amorphous or crystalline typically of metallic elements or nonmetals (e.g., semi-metallics) such as Si, and B combined with oxygen, carbon, nitrogen or combinations thereof with it being understood that this does not include polyatomic anions such as nitrate, and carbonate. The ceramic coating is comprised of C, which herein means that at least one molar percent of the anion (e.g., oxygen "oxide", carbon "carbide" or nitrogen "nitride") is C. In ascending preference, the carbon is at least about 5%, 10%, 20%, 30%, 40%, 50%, 60%, 70%, 80%, 90%, 95%, 98%, 99% or essentially 100% of the molar amount of anion in the ceramic coating. Essentially 100% means that there may be traces of other anionic impurities, but these are typically less than 500 parts per million by mole, but is also understood that carbon containing ceramics when exposed to water and oxygen in the atmosphere will almost invariably pick up some surface oxygen, which is contemplated by the invention.

In one embodiment, the ceramic coating is metal carbide, where the metal is any metal such as a transition metal or combinations of transition metals (e.g., Ti, Ni, Ta, Mo, W, Hf, Zr, Mn, Nb, Cr, V). In another embodiment, the ceramic coating is a metal-silicon carbide, with the metal being one of those just described. In another embodiment, the ceramic coating is silicon-boron carbide or metal-silicon-boron carbide. In yet another embodiment, the carbide is a boron carbide or metal-boron carbide, where the metal may be any metal such as described above and aluminum. The ceramic coating may also be silicon carbide. The ceramic coating may also be any one of the above except that instead of a simple carbide, the compound is an oxy-carbide, nitride-carbide, oxy-nitride-carbide so long as the amount of carbon is as described above. When anions such as nitrogen or oxygen are present they may be of any ratio to each other (N to O). It is preferred, that if the ceramic coating has another anion other than carbon, that the anion is oxygen (i.e., oxy-carbide).

The ceramic coating may be any thickness such that the useful life of the alkali catalyst is extended, but not so thick that it appreciably decreases the effect of the alkali to burn soot. Appreciably, means that the balance temperature is not raised by more than about 20% versus the same alkali catalyst without the coating. Preferably, the balance temperature is not raised by at most about 15%, more preferably at most 10%, even more preferably at most about 5% and most preferably not statistically changed at all. Typically, the coating is at least about 5 nanometers, to at most about 5 micrometers. The thickness may also range from at least about 10, 25, 50, 75, 100, 125, 150, 175 or 200 nanometers to at most 4, 3, 2, 1 or 0.5 micrometer(s).

In one embodiment, because it may be advantageous to have small particulates (e.g., less than 1 micrometer in diameter) of catalyst, the ceramic coating may be a coating that has a gradient extending to the center of such particles.

The coating may only cover a portion of the surface of the alkali catalyst, so long as the coating improves the useful life of the alkali catalyst. Illustratively, the coating typically covers at least about 50% of the surface of the alkali catalyst on the ceramic substrate. Note, that in some embodiments, the alkali catalyst may be fused to the surface of the ceramic substrate and as such need not be coated by the ceramic coating containing carbon, but just a portion of such alkali catalyst having an interface with the atmosphere. Typically, at least about 60%, 70%, 80%, 90%, 95%, 99% or even essentially all of the alkali catalyst surface is covered by the carbon containing ceramic coating. Note that if the alkali catalyst is at least partially fused to the substrate as described herein the alkali catalyst surface being covered by the carbon containing coating only refers to the alkali catalyst surface which has an interface with the atmosphere prior to being coated by the carbon containing ceramic coating.

Generally, the carbon containing ceramic coating is porous, but may be dense. Illustratively, the porosity of the coating may range from fully dense to 90% porous. The porosity may have differing shapes, distribution and connectivity (e.g., open versus closed porosity). Typically the total porosity is at least about 1%, 5%, 10%, 20% or 30% to at most about 85%, 80%, 75%, 70%, 65% or 50%. In addition, commonly, the open porosity is at least about 5%, 10%, 15%, 20% or 25% to at most about 80%, 75%, 70%, 65%, 60% or 55%.

Surprisingly, the ceramic coating containing carbon, does not decrease the catalytic effect and even may lower the soot combustion temperature (balance point) of the alkali catalyst. In addition said coating lengthens the useful life of the alkali catalyst when burning soot. The carbon containing ceramic coating may be crystalline or amorphous as described above for the alkali catalyst. Preferably, the C containing ceramic coating is amorphous.

In addition to the coated alkali catalyst, the porous ceramic may also have other catalysts useful, for example, in Diesel exhausts. For example, NOx catalysts or storage compounds, HC catalysts, CO catalysts and the like may be present on the porous ceramic body. Examples of some optional catalysts are as follows.

A first exemplary optional catalyst is directly bound-metal catalysts, such as noble metals, base metals and combinations thereof. Examples of noble metal catalysts include platinum, rhodium, palladium, ruthenium, rhenium, silver and alloys thereof. Examples of base metal catalysts include copper, chromium, iron, cobalt, nickel, zinc, manganese, vanadium, titanium, scandium and combinations thereof. The metal catalyst, preferably, is in the form of a metal, but may be present as an inorganic compound, such as an oxide, nitride and carbide, or as a defect structure within the ceramic grains of the porous ceramic. The metal may be applied by any suitable technique, such as those known in the art. For example, the metal catalyst may be applied by chemical vapor deposition.

A second exemplary optional catalyst is a combination of ceramic particles having metal deposited thereon. These are typically referred to as wash coats. Generally, wash coats consist of micrometer sized ceramic particles, such as zeolite, aluminosilicate, silica, ceria, zirconia, barium oxide, barium carbonate and alumina particles that have metal deposited thereon. The metal may be any previously described for directly deposited metal. A particularly preferred wash coat catalyst coating is one comprised of alumina particles having a noble metal thereon. It is understood that the wash coat may be comprised of more than one metal oxide, such as alumina having oxides of at least one of zirconium, barium, lanthanum, magnesium and cerium.

A third exemplary optional catalyst is a perovskite-type catalyst comprising a metal oxide composition, such as those described by Golden in U.S. Pat. No. 5,939,354.

The alkali catalyst such as for an amorphous alkali catalyst (eg. alkali, Si, Al or combination) thereof may be deposited upon the porous ceramic by any suitable method such as one known in the art. For example one or more of the catalyst components may be deposited by a method such as described in U.S. Pat. Nos. 4,515,758; 4,740,360; 5,013,705; 5,063,192; 5,130,109; 5,254,519; 5,993,762 and; U.S. Patent Application Publications 2002/0044897; 2002/0197191 and 2003/0124037; International Patent Publication WO97/00119; WO 99/12642; WO 00/62923; WO 01/02083 and WO 03/011437; and Great Britain Patent No. 1,119,180.

Catalyzed Soot Filter Forming Method(s)

In one embodiment, an alkali catalyst is coated with a silicon, boron or metal containing organic polymer or organic oil (silicone oil) that is deposited on the alkali catalyst and then heated and decomposed to form the ceramic coating containing carbon on the alkali catalyst. Any suitable method may be used to mix the alkali metal catalyst and silicon containing polymer such as mixing the polymer and alkali catalyst in a carrier fluid such that the polymer deposits from the fluid onto particles of the alkali catalyst. After depositing, the carrier fluid is removed by any suitable technique such as drying under heat, vacuum, infra-red, microware, freeze drying or simply air dried. In another embodiment, the metal containing organic may be evaporated and deposited directly on the alkali catalyst from the gas phase. After the carrier fluid is removed, the alkali catalyst particles having said polymer thereon is heated under an atmosphere sufficient to decompose the organic polymer and forming the carbon containing ceramic coating on the alkali catalyst (i.e., form the soot catalyst).

In another illustration, precursor particles, precursor droplets or combination thereof of the alkali catalyst are dispersed in a liquid media (emulsion or dispersion), in which the liquid media has dissolved therein the material that forms a ceramic coating comprised of C bonded to a metal, semimetallic element or combination thereof upon heating. After forming such emulsion or dispersion the liquid media is removed and the remaining residue is heated as described herein to form the coated alkali catalyst. The alkali catalyst may be deposited on a substrate prior to heating or after heating to form a substrate having the coated alkali catalyst thereon.

The temperature and time of the heating must be sufficient enough to decompose the polymer and form the carbon containing ceramic coating, but not so great that the alkali catalyst substantially volatilizes. Generally, the heating temperature is at most about 1400° C., but is preferably in ascending preference is at most about 1350°, 1300°, 1250°, 1200°, 1150° C., 1100°, 1050° and 1000° C. The temperature, generally, is at least 500° C. or else the time to decompose and form the carbon containing ceramic tends to be too long. Typically the temperature is at least in ascending order 600°, 650°, 700°, 750° and 800° C. The time at temperature may be any suitable to form the carbon containing ceramic coating. Typically the time may range from minutes to days, with practical time of several minutes to several hours being typical.

The atmosphere, typically, is one that is sufficiently devoid of oxygen such that the polymer does not merely oxidize forming a metal oxide. Some oxygen, however, may be present such that an oxy-carbide is formed if desired. Typically, the atmosphere may be inert (e.g., noble gas) or autogenic (i.e., sealed and the atmosphere created by the decomposition or reaction of the polymer with the gasses in the sealed chamber is sufficient to form the carbon containing ceramic coating). Reducing gasses (e.g., hydrogen) may also be employed individually or in mixtures of other gasses.

Examples of suitable polymers to form the carbon containing ceramic may be any of those known in the art to form such ceramics upon decomposition. These type of polymers are often referred to as preceramic polymers. Exemplary polymers may be any of those described by U.S. Pat. Nos. 4,226, 896; 4,310,482; 4,800,221; 4,832,895; 5,312,649; 6,395,840 and 6,770,583 and in Defense Technical Information Center publication, *Preceramic Polymers: Past, Present and Future*, Seyferth, Dietmar, Accession Number: ADA258327, Nov. 2, 1992 and *Comprehensive Chemistry of Polycarbosilanes, Polysilazanes, and Polycarbosilazanes as Precursors of Ceramics*, M. Birot et. a., Chem. Rev. 1995, 95, 1443-1477. The polymer may be, silicones or silicone oils when making silicon carbide coatings or silicon oxy-carbide coatings, such as described by *Thermal Decomposition of Commercial Silicone Oil to Produce High Yield High Surface Area SiC Nanorods*, V. G. Pol et. al., J. Phys. Chem. B 2006, 110, 11237-11240. A particular example, is the commercially available polymer STARFIRE SMP-10 available from Starfire Systems Inc., Malta, N.Y.

The coating may also be formed by suitable vapor phase deposition methods using the above polymers or other starting compounds and other methods such as described in Table 9.1 and 9.2 and subchapter 14.4.2 (Carbide Coatings) in *Handbook of Tribology Materials, Coating and Surface Treatments*, B. Bhushan and B. K. Gupta, McGraw-Hill, Inc., NY, NY, 1991.

After the soot catalyst is formed as described above, the soot catalyst may be deposited on a porous ceramic body, by any known method for depositing known catalyst on such ceramic bodies, which are commonly porous honeycombs as described above. Generally, this is accomplished by creating a slurry of the soot catalyst (i.e., alkali catalyst having the ceramic coating comprised of carbon) in a carrier fluid. The slurry is then contacted with the porous ceramic body by any convenient technique such as spraying, dipping and the like. After contacting the slurry with the porous ceramic, the excess carrier may be removed as described above for removing carrier fluids. A further heating may then be used to ensure good bonding of the soot catalyst to the porous ceramic body. The temperature and time for such heating generally corresponds to the heating described for decomposing the preceramic polymers.

In another embodiment, the alkali catalyst may first be deposited on the porous ceramic body. Illustratively, the alkali catalyst when it is an oxide glass containing alkali may be formed by precipitating a compound such as an alkali silicate, aluminate or combination thereof dissolved in a liquid (generally water) containing the alkali silicate, aluminate, or alumino-silicate.

In this illustration, the alkali catalyst is prepared by exposing the porous ceramic body to an alkali containing compound that is a silicate, aluminate, or alumino-silicate or combination thereof. Generally, the alkali silicate, aluminate or alumino-silicate is a colloid dispersed within a liquid. Colloid herein means a particulate having an average particle size of less than 1 micrometer by number. The colloid may be crystalline or amorphous. Preferably, the colloid is amorphous. The colloid is preferably a Na, Cs, K or combination thereof silicate. Preferably the colloid is a Cs, K or combination thereof silicate. Most preferably, the colloid is K or Cs silicate. Exemplary alkali silicates, aluminates, alumino-silicates include, clays, synthetic colloids such as those known in the art and available under the tradenames such as KASIL and N, PQ Corporation, PO Box 840, Valley Forge, Pa.; ZACSIL, Zaclon Incorporated, 2981 Independence Rd., Cleveland, Ohio; Sodium Silicates, Occidental Chemical Corporation, Occidental Tower, 5005 LBJ Freeway, Dallas, Tex.

The colloid preferably has a small particle size where all of the particles are less than 1 micrometer in diameter by number. Preferably the average particle size is less than about 500 nanometers (nm), more preferably less than about 250 nm, even more preferably less than about 100 nm, and most preferably less than about 50 nm to preferably at least about 1 nm, more preferably at least about 5 nm, and most preferably at least about 10 nm in diameter by number.

The porous body may be exposed to the aforementioned alkali silicate, aluminate or alumino-silicate by any suitable method such as those known in the art. For example, a liquid dispersion of the colloid may be impregnated into the porous body by spraying, dipping, immersing and then dried.

After contacting the porous ceramic, for example, with the colloid, the porous body is heated, for example, to form the amorphous catalytic phase and if desired fuse the catalytic phase to the porous ceramic body. Generally, the heating temperature is at least about 400° C. to about 1600° C. Typically, the temperature is at least about 500° C. to about 1000° C. Generally, the atmosphere needs to contain a sufficient amount of oxygen to ensure the glass is a silicate, aluminate or alumino-silicate (i.e., one containing oxygen). Generally, air is suitable to heat the catalyst components to form the amorphous catalytic phase. If desired or necessary, another heating in a reducing or inert atmosphere to similar temperatures just described may be performed to facilitate the formation of other optional catalyst such as a noble metal.

After the alkali catalyst is established on the porous ceramic body, it then is coated with the ceramic coating containing carbon by any one of the methods described to coat the alkali catalyst that has not already been deposited on the ceramic body.

EXAMPLES

Example 1

A 0.75" (1.9 cm)×0.75" (1.9 cm)×3" (7.6 cm) acicular mullite (ACM) Diesel particulate filter (DPF) (200 cells/in$^2$) made in the same manner as described as described by Example 4 of WO 03/082773A1 (including heat treating to 1400° C. as also described in Example 4 of WO 03/082773A1), was coated with cesium silicate catalyst (4SiO2:Cs$_2$O) by applying 6-5 ml of a freshly prepared precursor solution composed of 8.974 g Ludox TMA 34 wt % silica, 9.747 g 50 wt % Cesium acetate solution, 0.10 g 50 wt % citric acid solution and 6.364 g water to the DPF. The solution gelled in 1 to 2 hours at room temperature. The DPF was dried overnight at 120° C. then calcined in air at 700° C. for 1 h to form an alkali coated catalyst DPF.

A silicon carbide layer was applied to the the alkali catalyst coated DPF as follows. Approximately 7 mL of a solution of 5 parts toluene to 1 parts allylhydridopolycarbosilane SP matrix polymer-Var. 10, (Starfire Systems Inc., 877 25th Street Watervliet N.Y. 12189) was applied to the filter. Excess solution was removed by shaking. After air drying for several hours the filter was placed in a 120° C. oven overnight. The filter was heated in inert gas from room temperature to 400° C. at 2° C./minute and then held for 30 minutes prior to heating at 1° C./minute to 600° C. After 1 hour at 600° C., the filter was heated to 1000° C. at 2° C/min, held for 1 hour, and then cooled in the furnace to room temperature. The weight gain was 5%.

Comparative Example 1

An ACM DPF was prepared in the same way as in Example 1 except that no SiC layer was applied (i.e., the filter only has an alkali catalyst without a ceramic coating containing carbon).

Engine Testing

Figure 2:
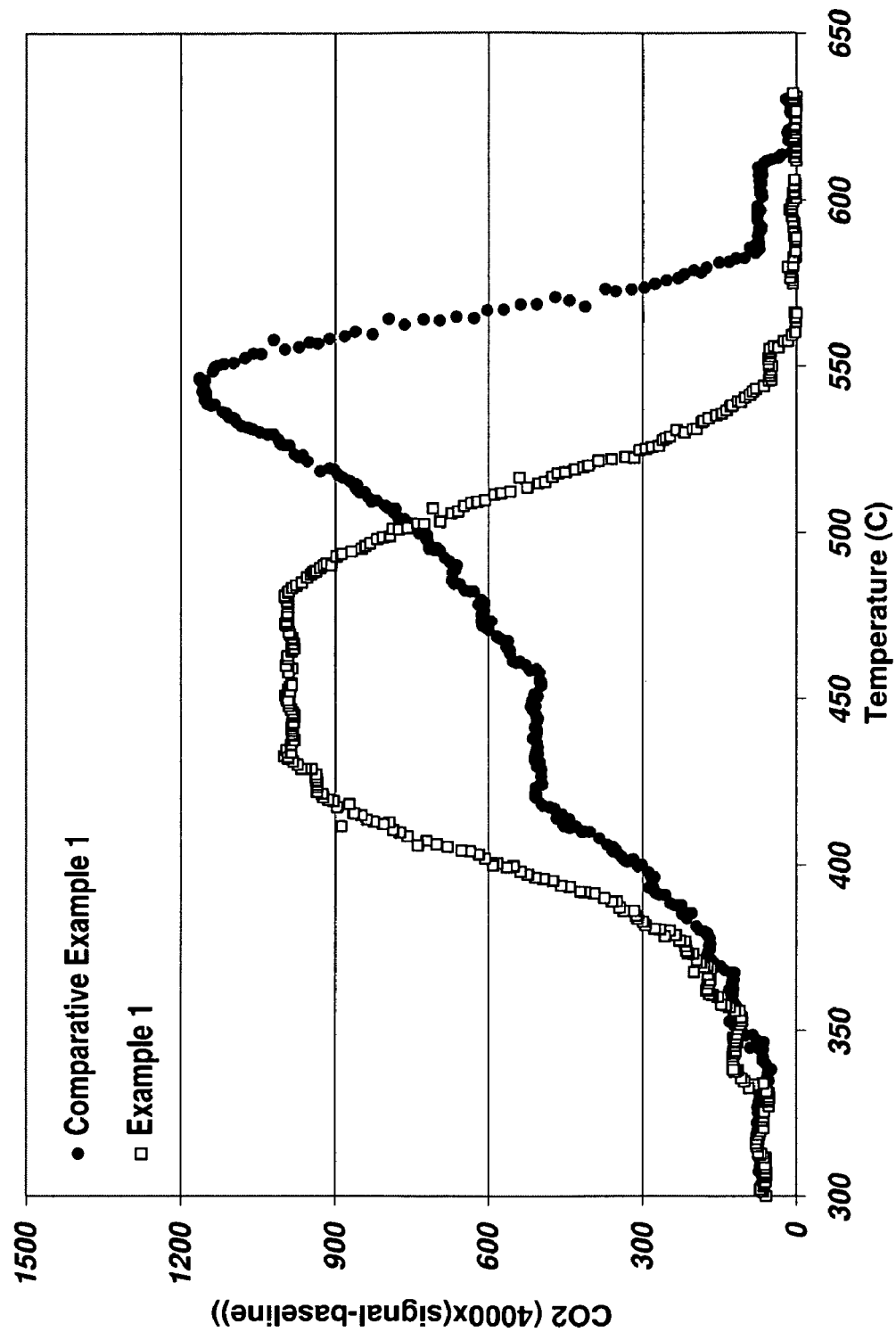
FIG. 2 is a graph of the $CO_2$ concentration in the exhaust during the regeneration of the Diesel particulate filter having the soot catalyst of this invention (Example 1) versus the same filter having the same alkali catalyst that is not coated with a carbon containing ceramic coating (Comparative Example 1) after collecting soot and regenerating soot for 200 hours on a Diesel engine.

The Example 1 and Comparative Example 1 ACM DPFs were placed in a holder with 14 other DPF samples and clamped into the exhaust system of a 350 cc diesel engine connected to an electrical generator. The engine was fuelled with ultra low sulfur diesel and run under constant load and rpm. Periodic regenerations of the filters (approximately every 4 h) were accomplished by heating the exhaust gas with an inline burner to 550° C. for 15 minutes. The Example 1 and Comparative Example 1 ACM DPFs were removed after the initial soot buildup and after 200 hours of time in the exhaust (not counting regenerations performed in the exhaust system). The initial and final soot loading was burned off for each filter separately in a reactor that allowed the CO$_2$ concentration in the exhaust stream to be monitored. The reactor was fed 20 liters/minute 10% O$_2$ in N$_2$ and ramped from 200° C. to 615° C. at 10° C./min. The recorded data for the initial burnout is shown in FIG. 1 for the Example and Comparative Example. The recorded data for the final (200 hour) burnout of soot is shown in FIG. 2.

From FIG. 1, it is apparent that the behavior of the catalyst in the Example and Comparative Example are quite similar upon the first burnout of soot. That is the onset, peak and completion of the burning of soot for the Example 1 is within about 20° C. of the Comparative Example 1. Surprisingly, however, even at the outset with the ceramic coating on the alkali catalyst, the temperatures are lower.

The catalyst of Example 1 after 200 hours of soot collection and regeneration is far superior. That is, the onset, peak and completion of burning of the soot as is substantially lower for the Example 1 catalyst compared to the Comparative Example 1 catalyst as is readily apparent from FIG. 2. For example, the peak and completion of burning is on the order of 100° C. less than for the Example 1 catalyst compared to the Comparative Example 1 catalyst. From this, it is readily apparent that the alkali catalyst coated with the ceramic coating of this invention realizes much improved long term performance while not sacrificing initial catalyst performance.

What is claimed is:

1. A soot catalyst comprised of an alkali compound at least partially coated by a ceramic coating comprised of C bonded to a metal, semimetallic element or combination thereof.

2. The soot catalyst of claim 1, wherein the alkali compound is an oxide glass.

3. The soot catalyst of claim 1, wherein the alkali is Cs, K or combination thereof.

4. The soot catalyst of claim 3, wherein the alkali is Cs.

5. The soot catalyst of claim 2, wherein the glass is a silicate.

6. The soot catalyst claim 1, wherein the ceramic coating comprised of carbon is a carbide, oxy-carbide, nitride-carbide, oxy-nitride-carbide of a metal, semi-metallic element or combination thereof.

7. The soot catalyst of claim 6, wherein metal is Ti, Ni, Ta, Mo, W, Hf, Zr, Mn, Nb, Cr, V or combination thereof and the semimetallic element is Si, B or combination thereof.

8. The soot catalyst of claim 6, wherein the ceramic coating is a metal-Si carbide, metal-Si oxy-carbide, B—Si carbide, B—Si oxy-carbide, SiC, Si oxycarbide or combination thereof.

9. The soot catalyst of claim 6, wherein the ceramic coating is SiC or Si oxy-carbide.

10. The soot catalyst of claim 9, wherein the ceramic coating is SiC.

11. A catalyzed soot filter comprised of a porous ceramic body having thereon a soot catalyst of any one of the soot catalysts of the preceding claims.

12. The soot catalyst of claim 1, wherein the ceramic coating containing carbon is at least 10% porous.

13. The soot catalyst of claim 12, wherein said coating is at least 20% porous to at most about 90% porous.

14. The soot catalyst of claim 13, wherein said coating covers at least 50% of the surface of the alkali compound.

15. The soot catalyst of claim 1, wherein the alkali compound is an oxide glass that is an aluminosilicate.

16. A method of forming a catalyzed soot filter comprising, contacting a porous ceramic body with an alkali compound, coating the alkali compound with a material that forms a ceramic coating comprised of C bonded to a metal, semimetallic element or combination thereof upon heating, and heating the porous ceramic body to form said catalyzed soot filter comprised of the porous ceramic body coated with soot catalyst comprised of an alkali compound having coated on at least a portion of the alkali compound a ceramic coating comprised of C bonded to a metal, semimetallic element or combination thereof.

17. The method of claim 16, wherein the material that forms the ceramic coating comprised of C is comprised of an organic polymer or organic oil containing Si.

18. The method of claim 17, wherein the heating is at most about 1100° C.

19. The method of claim 18, wherein said coating containing carbon is amorphous.

20. The method of claim 19, wherein the said coating is silicon carbide or silicon oxy-carbide.

* * * * *